United States Patent [19]

Takata et al.

[11] Patent Number: 5,246,735
[45] Date of Patent: Sep. 21, 1993

[54] PROCESS FOR PRODUCING RUBBER-REINFORCING AROMATIC POLYAMIDE MULTIFILAMENT YARN

[75] Inventors: Tadahiko Takata, Osaka; Masahiro Yamaguchi, Ibaraki, both of Japan

[73] Assignee: Teijin Limited, Osaka, Japan

[21] Appl. No.: 936,614

[22] Filed: Aug. 27, 1992

[30] Foreign Application Priority Data

| Sep. 5, 1991 | [JP] | Japan | 3-252792 |
| Sep. 10, 1991 | [JP] | Japan | 3-257215 |
| Sep. 11, 1991 | [JP] | Japan | 3-258753 |
| Oct. 14, 1991 | [JP] | Japan | 3-291962 |
| Oct. 15, 1991 | [JP] | Japan | 3-293852 |
| Jun. 23, 1992 | [JP] | Japan | 4-164858 |

[51] Int. Cl.$^5$ .......................... B05D 5/10; B05D 3/10
[52] U.S. Cl. ............... 427/175; 427/385.5; 427/386; 428/383; 428/395
[58] Field of Search ............... 474/271; 428/383, 395; 156/910, 137, 148, 315; 427/208.8, 412, 175

[56] References Cited

U.S. PATENT DOCUMENTS

| 3,748,291 | 7/1973 | Bhakuni et al. | 156/315 |
| 4,248,938 | 2/1981 | Takata et al. | 428/395 |
| 4,557,967 | 12/1985 | Willemsen et al. | 428/395 |
| 4,606,972 | 8/1986 | Marshall | 428/395 |
| 4,756,925 | 7/1988 | Furukawa et al. | 428/395 |
| 5,128,054 | 7/1992 | Chakravarti | 428/395 |
| 5,151,142 | 9/1992 | Imai et al. | 156/910 |

FOREIGN PATENT DOCUMENTS

2008085 1/1977 Japan ................... 428/383

OTHER PUBLICATIONS

Kirk-Othmer Encyclopedia of Chemical Technology, 1979, vol. 8, p. 577.
Derwent Publications Ltd., London, GB; Mar. 1988, AN 122766 & JP-A-63 066 382 (Bridgestone Tire K.K.) *Abstract* & US-A-5,151,142, Imai, et al.), Sep. 29, 1992.
Derwent Publications Ltd., London, GB; Jul. 1987 AN245394 & JP-A-62 166 101 (Bridgestone Tire K.K.) *Abstracts* & US-A-5 151 142 (Imai, et al.), Sep. 29, 1992.
Derwent Publications Ltd., London, GB; May 1990 AN 181659 & JP-A-2 118 180 (Toyo Tire Cord K.K.) *Abstracts*.
Derwent Publications Ltd., London, GB; Aug. 1989 AN 282693 & JP-A-1 207 480 (Toray Ind. Inc.) *See both Abstracts*.
Abstract of JP-01-207480, Toray Ind. Inc., Aug. 1989.
Abstract of JP04-29644, Mitsuboshi Belting Ltd, Jan. 1992.

Primary Examiner—Michael Lusigan
Assistant Examiner—Erma Cameron
Attorney, Agent, or Firm—Burgess, Ryan & Wayne

[57] ABSTRACT

An aromatic polyamide multifilament yarn having a high bonding property to a rubber material and a high resistance to fraying of individual filaments, is produced by impregnating an aromatic polyamide multifilament yarn with a treating liquid comprising a first liquid rubber component (A) comprising at least one rubber compound provided with terminal hydroxyl or epoxy groups and having a molecular weight of 500 to 10,000, a second liquid rubber component (B) comprising at least one rubber compound provided with terminal isocyanate groups and having a molecular weight of 500 to 10,000, and an additive selected from antioxidants, antiaging agents, and epoxy compounds; heat treating the impregnated multifilament yarn at 100° to 260° C. for 30 to 260 seconds; twisting the heat treated multifilament yarn at a twist coefficient K satisfying the relationship (I):

$$1 \leq K \leq 5 \quad (I)$$

wherein K is defined by the equation (II):

$$K = (T \times D^{\frac{1}{2}})/2874 \quad (II)$$

T=twist number/m and D=denier of the multifilament yarn;
applying an adhesive agent containing a resorcinol-formaldehyde resin and a rubber latex, to the twisted multifilament yarn and curing the adhesive agent on the multifilament yarn.

28 Claims, No Drawings

PROCESS FOR PRODUCING RUBBER-REINFORCING AROMATIC POLYAMIDE MULTIFILAMENT YARN

BACKGROUND OF THE INVENTION

1. Field of the Invention

The present invention relates to a rubber-reinforcing aromatic polyamide multifilament yarn. More particularly, the present invention relates to a rubber-reinforcing aromatic polyamide multifilament yarn having an excellent bonding property to rubber materials and a high resistance to fraying of individual filaments.

When a multifilament yarn-reinforced rubber cyclic belt, for example, timing belt or low edge V-belt is produced by cutting in round slices a cylindrical product in which a reinforcing multifilament yarn material (cord) is embedded in a rubber matrix, peripheral faces of the mutifilament yarns are exposed on the cut face of the belt, on this cut face individual filaments are often frayed from the multifilament yarns. The rubber-reinforcing multifilament yarn of the present invention exhibits a high resistance to the fraying of the individual filaments.

2. Description of the Related Art

It is known that aromatic polyamide filaments or fibers generally have excellent mechanical strength, modulus of elasticity, dimensional stability and heat resistance and thus are useful as reinforcing fibers for tires, belts and hoses that are used under hard conditions. The aromatic polyamide filaments, in particular, has a high specific tensile strength and specific modulus of elasticity and therefore are useful as light weight reinforcing filaments, in place of reinforcing steel wires.

Generally, when the aromatic polyamide multifilament yarns are used as reinforcing filaments for a timing belt or low edge V-belt, the belt is produced in such a manner that a cylindrical material in which an aromatic polyamide multifilament yarn is embedded in a rubber matrix is formed, and the cylindrical material is cut in round slices by using a cutter. On the cut faces of the belt, peripheral faces of the multifilament yarns are exposed, and a portion of the individual filaments is frayed from the multifilament yarns and extend from the cut faces of the belt to the outside therefore, thereby causing the quality of the resultant belt to be lowered. Namely, if the belt having the frayed individual filaments is placed on a pulley and subjected to rotation, the frayed individual filaments are abraded by the pulley and divided into fine pieces that are sprinkled around the pulley, or the frayed individual filaments reduces the durability of the belt.

The above-mentioned disadvantages can be eliminated by mechanically removing or cutting the frayed individual filaments from the belt during the belt-producing procedure. This removal operation significantly reduces the productivity of the belt. Accordingly, this disadvantage is a significant barrier against industrially using the aromatic polyamide multifilament yarns as a reinforcing material for rubber material.

To eliminate the above-mentioned disadvantages, Japanese Unexamined Patent Publication Nos. 1-207,480 and 4-29,644 disclose an attempt to prevent the fraying of individual filaments from the aromatic polyamide multifilament yarns by treating the multifilament yarn with a specific treating agent. However, this attempt was not always successful because the treated aromatic polyamide multifilament yarns exhibited a reduced mechanical strength, lowered bonding properties and/or a poor durability.

SUMMARY OF THE INVENTION

An object of the present invention is to provide a process for producing a rubber-reinforcing aromatic polyamide multifilament yarn having excellent bonding properties to rubber materials, and a high resistance to fraying of individual filaments therefrom even when the peripheral faces of the individual filaments embedded in the rubber matrix are exposed to the outside, without reducing the resistance of the multifilament yarn to fatigue.

The above-mentioned object can be attained by the process of the present invention for producing a rubber-reinforcing aromatic polyamide multifilament yarn, comprising the steps of:

impregnating an aromatic polyamide multifilament yarn with a treating liquid comprising:

(A) a first liquid rubber component comprising at least one rubber compound provided with two terminal groups consisting of a member selected from the groups consisting of hydroxyl and epoxy groups per molecule thereof and having a molecular weight of from 500 to 10,000 and (B) a second liquid rubber component comprising at least one rubber compound provided with two terminal isocyanate groups per molecule thereof and having a molecular weight of 500 to 10,000;

heat-treating the impregnated multifilament yarn at a temperature of from 100° C. to 260° C. for 30 to 260 seconds;

twisting the heat-treated multifilament yarn at a twist coefficient satisfying the relationship (I):

$$1 \leq K \leq 5 \qquad (I)$$

wherein K represents a twist coefficient of the multifilament yarn, defined by the equation (II):

$$K = (T \times D^{\frac{1}{2}})/2874 \qquad (II)$$

in which T represents a twist number per m of the mutifilament yarn, applied thereto, and D presents a denier of the multifilament yarn; and applying an adhesive agent containing a resorcinol-formaldehyde resin and a rubber latex, to the twisted multifilament yarn.

In the process of the present invention, the hydroxyl-terminated rubber compound of the first liquid rubber component (A) may be further provided with at least one epoxy group located in the inside portion of the molecule thereof.

Also, in the process of the present invention, the treating liquid for the impregnating step optionally further comprises an antioxidant comprising at least one member selected from the groups consisting of antioxidant hindered phenolic compounds, antioxidant amine compounds, antioxidant phosphorus compounds and antioxidant sulfur compounds.

Further, in the process of the present invention, the treating liquid for the impregnating step optionally further comprises a rubber antiaging agent comprising at least one member selected from the group consisting of antiaging aldehyde-amine reaction products, antiaging ketone-amine reaction products, antiaging amine compounds and antiaging phenol compounds.

Further, in the process of the present invention, the twisting step is preferably carried out in such a manner that the heat treated multifilament yarn is primary-twisted at a primary twist coefficient satisfying the relationship (III):

$$0.2 \leq K \leq 1 \quad \text{(III)}$$

wherein K is as defined above, then a plurality of the primary-twisted multifilament yarns are paralleled to each other, and the resultant paralleled multifilament yarn is final-twisted at a final twist coefficient satisfying the relationship (I):

$$1 \leq K \leq 5 \quad \text{(I)}$$

wherein K is as defined above.

DESCRIPTION OF THE PREFERRED EMBODIMENTS

The aromatic polyamide multifilament yarn usable for the present invention preferably comprises an aromatic polyamide having aromatic recurring units in an amount of 80 to 100 molar %, more preferably 85 to 100 molar %, based on the total molar amount of all the recurring units.

The aromatic recurring units include those of the formulae:

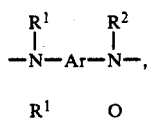

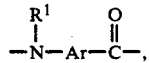

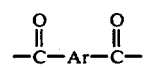

and

wherein $R^1$ and $R^2$ respectively and independently from each other represent a member selected from the group consisting of a hydrogen atom and alkyl groups having 1 to 5 carbon atoms, for example, methyl, ethyl, propyl, butyl and pentyl groups, preferably the hydrogen atom, and Ar represents a divalent aromatic group.

The divalent aromatic group is preferably selected from the groups of the formulae:

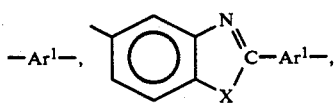

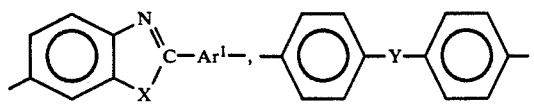

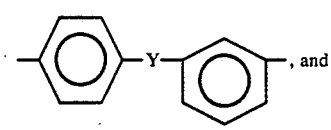

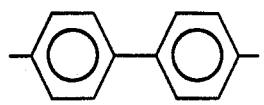

wherein $Ar^1$ represents a divalent aromatic cyclic group, for example, a phenylene groups or naphthylene group, X represents a member selected from —O—, —S— and —NH— bonds, preferably —O— and —NH— bonds, Y represents a member selected from —O—, —S—, —SO$_2$—, —CH$_2$—, —C(CH$_3$)$_2$—, —CO—, —NH— and NR$^3$— bonds in which R$^3$ represents an alkyl group having 1 to 5 carbon atoms, preferably —O—, —S— and —CO— bonds, more preferably an —O— bond.

Also, the divalent aromatic cyclic group represented by Ar is preferably selected from the group consisting of 1,4-phenylene, 1,3-phenylene, 4,4′-biphenylene, 1,5-naphthylene, 2,6-naphthylene and 2,5-pyridilene groups, more preferably is a 1,4-phenylene group.

The divalent aromatic group represented by Ar may be unsubstituted or substituted by one or more substituents selected from, for example, halogen atoms, for example, chlorine, bromine and fluorine atoms, lower alkyl groups, for example, methyl, ethyl, isopropyl, n-propyl groups, lower alkoxyl groups, for example, methoxyl and ethoxyl groups, a cyano group, an acetyl group and a nitro group.

The aromatic polyamide multifilament yarn usable for the present invention comprises at least one member selected from poly-p-aminobenzamide, poly-p-phenylene terephthalamide, poly-p-aminobenzhydrazideterephthalamide, poly-terephthalic acid hydrazide, and poly-m-phenylene-isophthalamide. Those aromatic polyamides may be used alone or as a mixture of two or more thereof.

The aromatic polyamide multifilament yarn preferably has a total denier of 200 to 9,000, more preferably 400 to 6,000, and is composed of 50 to 6,000 individual filaments having a denier of 0.5 to 10, more preferably 0.75 to 6.0.

In the process of the present invention, the treating liquid for the impregnating step comprises a first liquid rubber component (A) and a second liquid rubber component (B).

Generally, liquid rubber compounds having reactive and functional groups located at the two terminals of the molecule thereof are referred to as RFL liquid rubber compounds.

The first liquid rubber component (A) comprises at least one rubber compound provided with two hydroxyl groups or two epoxy groups located at the two terminals of the molecule thereof, and having a molecular weight of 500 to 10,000.

The hydroxyl-terminated rubber compound for the first liquid rubber component (A) is preferably selected from the group consisting of 1,2 type-polybutadiene glycol, 1,4-type polybutadiene glycol, 1,2 and 1,4-mixed type polybutadiene glycol, polyisoprene glycol, polychloroprene glycol, poly-1,3-pentadiene glycol and polycyclopentadiene glycol, each having a molecular weight of 500 to 10,000.

The hydroxyl-terminated rubber compound can be prepared by, for example, a radical polymerization of diene monomers in the presence of an initiator, for example, hydrogen peroxide, peracetic acid or an azo compound containing a hydroxyl group.

The epoxy-terminated rubber compound for the first liquid rubber component (A) is preferably selected from the group consisting of terminal-epoxidized 1,2-type polybutadiene, 1,4-type polybutadiene, 1,2 and 1,4-mixed type polybutadiene, polyisoprene, polychloroprene, poly-1,3-pentadiene and polycyclopentadiene compounds, each having a molecular weight of 500 to 10,000.

The epoxy-terminated rubber compound can be prepared by, for example, an epoxidation reaction of an ethylenically unsaturated hydrocarbon group (—CH=CH—) of a rubber compound with hydrogen peroxide and p-toluene sulfonic acid.

The hydroxyl-terminated rubber compound usable for the first liquid rubber component (A) may be provided with at least one epoxy group located in the inside portion of the molecule thereof, in addition to the two terminal hydroxyl groups.

The hydroxyl-terminated, epoxy-consisting rubber compound can be produced by oxidizing the hydroxyl-terminated rubber compound with a peroxide compound, for example, peracetic acid or hydrogen peroxide. In this oxidizing reaction, ethylenically unsaturated hydrocarbon groups (—CH=CH—) in the hydroxyl-terminated rubber compound, for example, poly-1,2-butadiene glycol, are completely or partially converted to epoxide groups

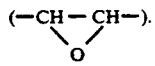

The hydroxyl-terminated, epoxy-containing rubber compound usable for the first liquid rubber component (A) is preferably selected from the group consisting of epoxidized poly-1,2-butadiene glycol, poly-1,4-butadiene glycol, polyisoprene glycol, polychloroprene glycol, poly-1,3-pentadiene glycol, and polycylopentadiene glycol compounds.

If the molecular weight of the hydroxyl or epoxy-terminated rubber compound for the first liquid rubber component (A) is less than 500, the resultant rubber component (A) exhibits an unsatisfactory bonding (adhesion) strength to the rubber materials.

Also, the molecular weight of more than 10,000 results in an undesirably raised viscosity of the resultant first liquid rubber component (A).

The second liquid rubber component (B) comprises at least one rubber compound provided with two isocyanate groups located at two terminals of the molecule thereof and having a molecular weight of 500 of 10,000.

The isocyanate-terminated rubber compound is preferably selected from the group consisting of 1,2-type polybutadiene diisocyanate, 1,4-type polybutadiene diisocyanate, 1,2 and 1,4- mixed type polybutadiene diisocyanate, polyisoprene diisocyanate, polychloroprene diisocyanate, poly-1,3-pentadiene diisocyanate and polycyclopentadiene diisocyanate.

The isocyanate-terminated rubber compound can be prepared by, for example, reacting a carboxyl-terminated rubber compound with an acryl azide compound.

In the treating liquid for the impregnating step, the first liquid rubber component (A), and the second liquid rubber component (B) are preferably present in a weight ratio ((A)/(B)) of 1:9 to 9:1, more preferably 2:8 to 8:2, still more preferably 3:7 to 7:3.

When the weight ratio ((A)/(B)) is more than 9:1, the resultant impregnated multifilament yarn exhibits an undesired poor bonding property to the rubber matrix and an unsatisfactory resistance to fraying of the individual filaments, whereas the resultant treating liquid exhibits an increased viscosity and the resultant impregnated multifilament yarn has a satisfactory mechanical strength.

When the weight ratio ((A)/(B)) is less than 1:9, the resultant impregnated multifilament yarn exhibits an undesirably high stiffness and thus in the twisting step, the utilization efficiency of the mechanical strength of the multifilament yarn becomes low, and therefore, the resultant twisted multifilament yarn exhibits an unsatisfactorily low mechanical strength.

In the impregnating step of the process of the present invention, the treating liquid is impregnated preferably in an amount of 1 to 25%, more preferably 5 to 20%, by dry solid weight based on the weight of the multifilament yarn, therein.

If the amount of the treating liquid impregnated in the multifilament yarn is less than 1% by dry solid weight, the resultant impregnated multifilament yarn exhibits an unsatisfactorily low resistance to fraying of the individual filaments and therefore when used as a reinforcing yarn for a power-transmission belt, the individual filaments, which are exposed at the edge portion of the belt to the outside, are easily frayed.

If the amount of the treating liquid is more than 25% by dry solid weight, the twisting step cannot effectively utilize the mechanical strength of the individual filaments, and thus the resultant twisted multifilament yarn possess unsatisfactory mechanical strength.

In the process of the present invention, the multifilament yarn to be subjected to the impregnating step with the treating liquid is preferably in a substantially non-twisted state.

The non-twisted multifilament yarn allows the treating liquid to uniformly penetrate and distribute therein. If a twisting step is applied to the multifilament yarn prior to the impregnating step, it becomes difficult for the treating liquid to uniformly penetrate in and evenly distribute throughout the multifilament yarn, and thus the individual filaments in the resultant multifilament yarn are not evenly bundled. Accordingly, the impregnating step with the treating liquid is preferably applied to the substantially non-twisted multifilament yarn.

The treating liquid for the impregnating step optionally further comprises an additional epoxy component (C), in addition to the first and second liquid rubber component (A) and (B). The additional epoxy component (C) comprises at least one epoxy compound containing at least two epoxy groups per molecule thereof and having an epoxy gram equivalent of 0.2 per 100 g of the epoxy compound.

The epoxy compound usable for the additional epoxy component (C) is preferably selected from the group consisting of a reaction product of polyhydric aliphatic alcohol compounds, for example, ethylene glycol, glycerol, sorbitol, pentaerythritol and polyethyleneglycol, with halogen-containing epoxide compounds, for example, epichlorohydrin; reaction products of polyhydric phenol compounds, for example, resorcinol, bis(4-hydroxyphenyl)dimethylmethane, phenolformaldehyde resins and resorcine-formaldehyde resins, with halogen-containing epoxide compounds, for example, epichlorohydrin; and polyepoxidization reaction products of unsaturated organic compounds with a peroxide compounds, for example peracetic acid and hydrogen peroxide, for example, 4-epoxycyclohexene-epoxide, 3,4-epoxycyclohexylmethyl-3,4-epoxycyclohexenecarboxylate, bis(3,4-epoxy-6-methyl-cyclohexylmethyl)adipate.

A preferable epoxy compound for the additional epoxy component (C) is a reaction product of polyhydric aliphatic alcohol compounds with epichlorohydrin, for example, polyhydric aliphatic alcohol—polyglycidylether compounds. These epoxy compounds effectively impart excellent characteristics to the products produced by the process of the present invention.

Preferably, the additional epoxy component (C) is present in an amount of 0.01 to 1.0 part, more preferably 0.02 to 0.9 part by dry solid weight per part of the total dry solid weight ((A) +(B)) of the first and second liquid rubber components (A) and (B).

The treating liquid for the impregnating step optionally further contains a curing agent for the rubber components (A) and (B). The curing agent consists, for example, of dibutyl tin dilaurate.

The treating liquid for the impregnating step optionally further comprises an organic solvent, for example, consisting of at least one member selected from the groups consisting of toluene, tetrahydrofurane, dioxane, methylethylketone and ethyl acetate.

The first and second liquid rubber components (A) and (B), and optionally, the additional epoxy component (C) are dissolved in the organic solvent.

The components (A) and (B), and optionally, the component (C) may be emulsified or dispersed in a liquid medium, for example, water, with the aid of a surfactant (emulsifying or dispersing agent), to provide the treating liquid.

In the process of the present invention, the impregnated aromatic polyamide multifilament yarn is heat treated at a temperature of from 100° C. to 260° C., preferably 150° C. to 250° C., for 30 to 260 seconds, preferably, 60 to 180 seconds.

When the heat-treating temperature is lower than 100° C. and/or the heat-treating time is shorter than 30 seconds, the curing reaction of the compounds impregnated in the multifilament yarn is not satisfactorily completed and thus the bundling effect for the individual filaments in the yarn is not sufficient. Also the resultant heat treated multifilament yarn exhibits an unsatisfactory bonding property to the rubber matrix and insufficient resistance to fraying of the individual filaments.

If the heat treating temperature is higher than 260° C. and/or the heat treating time is longer than 260 seconds, the compounds impregnated in the multifilament yarn are excessively cured and thus the heat-treated multifilament yarn possess an excessive degree of stiffness. This feature results in unsatisfactory mechanical strength of the product of the present invention. Namely, the resultant rubber-reinforcing multifilament yarn is not suitable as a reinforcing yarn for a power-transmission belt.

In the process of the present invention, the heat-treated aromatic polyamide multifilament yarn is twisted at a twist coefficient satisfying the relationship (I):

$$1 \leq K \leq 5 \qquad \text{(I)}$$

wherein K represents a twist coefficient of the multifilament yarn defined by the equation (II):

$$K = (T \times D^{\frac{1}{2}})/2874 \qquad \text{(II)}$$

in which T represents d twist number per m of the multifilament yarn, applied thereto, and D is a total denier of the multifilament yarn.

If the value of K is less than 1, the resultant rubber-reinforcing multifilament yarn exhibits an unsatisfactory resistance to fraying of the individual filaments when the yarn is used as a rubber-reinforcing material for a power-transmission belt.

If the value of K is more than 5, the twisting step results in a significant reduction in mechanical strength and in an undesirable increase in elongation of the resultant rubber-reinforcing multifilament yarn, and thus the resultant yarn is not suitable as a rubber-reinforcing material for a power-transmission belt.

In a preferable embodiment of the twisting step, the heat treated multifilament yarn that is substantially free from a twist is primarily twisted in a twisting direction and then finally twisted in the opposite direction to the primary twisting direction. The final twisting may be omitted.

In another embodiment of the twisting step, the heat-treated multifilament yarn is primarily twisted at a primary twist coefficient of from 0.2 to 1, namely $0.2 \leq K \leq 1$ wherein K is as defined above; then a plurality of the primarily twisted multifilament yarns are paralleled to each other, and the resultant paralleled multifilament yarn is finally twisted at a final twist coefficient of from 1 to 5, namely $1 \leq K \leq 5$ wherein K is as defined above.

In this embodiment, the primary twisting operation effectively causes the individual filaments in the multifilament yarn to be uniformly paralleled and thus the resultant primarily twisted multifilament yarn exhibits enhanced mechanical strength, because when an external force is repeatedly applied to the multifilament yarn, the applied external force is evenly absorbed by the uniformly paralleled individual filaments and thus the multifilament yarn exhibits enhanced fatigue resistance and endurance. Also, the primary twisting operation effectively causes the individual filaments to firmly adhere to each other and thus the resultant twisted multifilament yarn exhibits enhanced resistance to fraying of the individual filaments.

In the process of the present invention, an adhesive agent is applied to the twisted aromatic polyamide multifilament yarn. The adhesive agent comprises a resorcinol-formaldehyde resin and a rubber latex.

The resorcinol-formaldehyde resin for the adhesive resin is a condensation product of resorcinol and formaldehyde preferably in a molar ratio of from 1:0.1 to 1:8, more preferably from 1:0.5 to 1:5, still more preferably from 1:1 to 1:4.

The rubber latex for the adhesive agent preferably comprises at least one member selected from the group consisting of natural rubber latex, styrene-butadiene copolymer rubber latex, vinyl pyridine-styrene-butadiene terpolymer rubber latex, acrylonitrile copolymer rubber latex, hydrogenated acrylonitrile copolymer latex, chlorosulfonated polyethylene rubber latex and polychloroprene rubber latex. The above-mentioned rubber latexes can be used alone or in a mixture of two or more thereof.

The type of the rubber latex is selected in consideration of the type of the rubber matrix in which the rubber-reinforcing multifilament yarn is embedded.

In the adhesive agent usable for the present invention, the resorcinol-formaldehyde resin and the rubber latex are preferably present in a dry solid weight ratio of from 1:100 to 25:100, more preferably from 5:100 to 20:100.

In an embodiment of the adhesive agent-applying step, the adhesive agent further comprises an additional reactant consisting of at least one member selected from the group consisting of the formula:

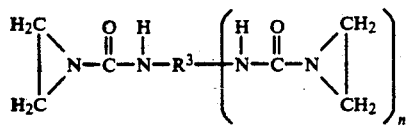

wherein $R^3$ represents a member selected from the group consisting of monovalent or divalent aromatic and aliphatic hydrocarbon groups, and n represents an integer of 1 or 2, and blocked isocyanate compounds.

The ethyleneurea compounds are disclosed in Japanese Examined Patent Publication No. 57-53912.

The additional reactant is preferably present in an amount of from 0.5 to 30% by weight based on the total dry solid weight of the resorcinol-formaldehyde resin and the rubber latex.

The adhesive agent is applied preferably in an amount of from 1% to 10% by dry solid weight based on the weight of the twisted filament yarn.

Preferably, the adhesive agent applied to the twisted multifilament yarn is dried at a temperature of from 100° C. to 150° C. for 30 to 260 seconds and then cured at a temperature of 150° C. to 260° C. for 30 to 260 seconds.

In an embodiment of the process of the present invention, the treating liquid for the impregnating step further comprises an antioxidant (D) comprising at least one member selected from the group consisting of antioxidant hindered phenolic compounds, antioxidant amine compounds, antioxidant phosphorus compounds and antioxidant sulfur compounds.

The typical antioxidant hindered phenolic compounds are triethyleneglycol-bis[3-(3-t-butyl-6-methyl-4hydroxyphenyl)propionate], 1,6-hexanediol-bis[3-(3,5-di-tert-butyl-4-hydroxyphenyl)propionate], 2,4-bis(n-octylthio)-6-(4-hydroxy-3,5-di-tert-butylanilino)-1,3,5triazine, pentaerythrityl-tetrakis[3-(3,5-di-tert-butyl4-hydroxyphenyl)propionate], 2,2-thio-diethylene-bis[3-(3,5-di-tert-butyl-4-hydroxyphenyl)propionate], octadecyl-3-[3,5-di-tert-butyl-4-hyroxyphenyl)propionate, N,N'-hexa-methylene-bis(3,5-di-tert-butyl-4-hydroxycinnamamide, 1,3,5-trimethyl-2,4,6-tris(3,5-di-tert-butyl-4-hydroxybenzyl)benzene.

The antioxidant hindered phenol compounds include sulfur-containing hindered phenol compounds, for example, 2,2-thiobis(4-methyl-6-tert-butylphenol), and 3,5-di-tert-butyl-4-hydroxybenzylphosphonate diethylester.

The typical antioxidant amine compounds are N,N'-di-sec-butyl-p-phenylene-diamine and alkylated diphenylamines.

The antioxidant phosphorus compounds include trisnonylphenylphosphite, triphenyl-phosphite, and tris (2,4-di-tert-butyl-phenyl)phosphite.

The antioxidant sulfur compounds include dibutyl-3,3'-thiodipropionate, dimystyl-3,3'-thiodipropionate, distearly-3,3'-thiodipropionate, pentaerythrityl-tetrakis(3-laurylthiopropionate) and ditridecyl-3,3-thiodipropionate.

The antioxidant (D) is preferably present in an amount of from 0.005 to 0.05 part, more preferably from 0.01 to 0.03 part, by weight per part by the total weight of the first and second liquid rubber components (A) and (B).

The antioxidant (D) is effectively prevent an undesirable oxidation and a cross-linking reaction of the double bonds contained in the rubber compounds in the treating liquid during the heat-treating step. This anti-oxidation action effectively prevents an undesirable reduction in the number of double bonds present in the rubber compound molecules applied to the multifilament yarn, and an undesirable increase in the stiffness of the impregnated multifilament yarn.

Due to the above-mentioned effects, an undesirable reduction in the mechanical strength of the multifilament yarn by the twisting step, and in fatigue resistance of the multifilament yarn is prevented.

Also, the addition of the antioxidant (D) to the treating liquid effectively increases interaction between the rubber components (A) and (B) with the adhesive agent, and enhances the bonding property of the resultant rubber-reinforcing multifilament yarn to the rubber matrix.

In another embodiment of the process of the present invention, the treating liquid for the impregnating step further comprises a rubber antiaging agent (E) comprising at least one member selected from the group consisting of antiaging aldehyde-amine reaction products antiaging ketone-amine reaction products, antiaging amine compounds and antiaging phenol compounds.

The typical antiaging aldehyde-amine reaction products are condensation reaction products of acetaldole with 1-naphthylamine.

The ketone-amine reaction products include polymerization products of 2,2,4-trimethyl-1,2dihydroquinoline.

The antiaging amine compounds include N,N'-dinaphthyl-p-phenylenediamine.

The antiaging phenol compounds include styrene-modified phenol compounds, 2,6-di-tert-dibutylmethylphenol, 2,2'-methylene-bis(4-methyl-6-tertbutylphenol) and 4,4'-thiobis(3-methyl-6-tertbutylphenol).

The rubber antiaging agent (E) is preferably present in an amount of from 0.005 to 0.05 part, more preferably from 0.01 to 0.03 part, by weight per part of the total dry solid weight of the first and second liquid rubber components (A) and (B).

The rubber antiaging agent effectively prevents the undesirable deterioration of the double bonds present in the rubber compounds in the treating liquid during the heat-treating step.

And because of this effect, undesirable crosslinking reactions between the reaction products of the rubber compounds are prevented, and thus an undesirable increase in stiffness of the impregnated, heat-treated multifilament yarn is inhibited.

The antiaging agent effectively prevents an undesirable reduction in the number of double bonds of the reaction products of the rubber components. Owing to this effect, the undesirable reductions in the mechanical strength, the bonding properties to the rubber matrix and the fatigue resistance of the twisted multifilament yarn, are prevented.

The treating liquid for the impregnating step optionally further comprises nickel dibutylthiocarbamate which is a well known antiaging agent for rubber compounds.

The rubber-reinforcing aromatic polyamide multifilament yarn produced by the process of the present invention posses excellent bonding properties to the rubber matrix and has a high resistance to fraying of the individual filaments. Namely, when the rubber-reinforcing multifilament yarn is embedded in a rubber matrix, the resultant power-transmission belt is quite free from undesirable fraying of individual filaments from the multifilament yarns exposing at the cut edge portions of the belt to the outside.

The first liquid rubber component (A) containing the hydroxyl- or epoxy-terminated rubber compound and the second liquid rubber component (B) comprising the isocyanate-terminated rubber compound are reacted with each other to form polyurethane film layers having a high adhesive power on the peripheral surfaces of the individual filaments. The individual filaments firmly adhere to each other through the polyurethane film layers, and this exhibits high anti-fraying properties. The adhesion of the individual filaments to each other can be improved by reactions of the adhesive agent containing the resorcinol-formaldehyde resin and the rubber latex with the urethane bonds or terminal groups in the polyurethane molecules in the film layers, or by crosslinking reactions between double bonds contained in the polyurethane molecules and the adhesive agent. Also, the adhesion can be improved by enhancing the wetting property of the polyurethane film layers with the adhesive agent.

EXAMPLES

The present invention will be further explained in the following specific examples, which are intended to be representative rather than restrictive of the scope of the present invention.

In the examples, the fraying resistance, cord bonding strength against peeling, T-bonding strength and tensile strength retention upon fatiguing were determined by the following test methods.

(1) Fraying resistance

A plurality of aromatic polyamide multifilament cord specimens are placed in parallel to each other between two rubber sheets having a thickness of about 2 mm, and the resultant test piece was vulcanized at a temperature of 150° C. under a press-pressure of 50 kg/cm² for 30 minutes to provide a multifilament cord-reinforced rubber sheet.

The resultant reinforced rubber sheet was cut along the longitudinal direction of the reinforcing cords so as to obtain a specimen having portions of the reinforcing cords exposed at the cut edge.

The appearance of the cut edge of the specimen was visually observed to determine the degree of fraying of the individual filaments at the cut edge.

The cut edge face of the specimen was abraded with an emery paper (#AA-150) and the appearance of the abraded edge face of the specimen was visually observed and the degree of fraying of the individual filaments was determined.

The test results are indicated as follows.
4: Substantially no fraying of the individual filaments was found.
3: A few filaments were frayed.
2: A small satisfactory number of filaments were frayed.
1: A number of individual filaments were frayed.

(2) Cord bonding strength against peeling

This cord strength refers to the bonding strength of a reinforcing cord to a rubber matrix against peeling thereof.

Seven reinforcing cords were embedded parallel to each other in a surface portion of a rubber sheet, and the resultant sheet was vulcanized at a temperature of 150° C. under a press pressure of 50 kg/cm² for 30 minutes.

The five cords not including the remaining two cords located at the outsidemost positions were peeled from the rubber sheet at a peeling rate of 200 mm/min. The bonding strength of the cords to the rubber sheet was represented by the force in kg/5 cords necessary to peel the cords from the rubber sheet.

(3) T-bonding strength

This T-bonding strength refers to a bonding strength of a cord to a rubber matrix against a shearing force.

A reinforcing cord was embedded in a rubber block, and the resultant reinforced rubber block was vulcanized at a temperature of 150° C. under a press presure of 50 kg/cm² for 30 minutes.

The cord was drawn out from the rubber block at a drawing out rate of 200 mm/min.

The bonding strength of the cord to the rubber block was represented by the force in kg/cm necessitated to draw out the cord from the rubber block.

(4) Tensile strength retention upon fatiguing

This tensile strength retention refers to fatigue resistance.

A belt type fatigue tester was employed.

A tensile strength $TS_0$ of a reinforcing cord was measured.

The reinforcing cord was put between two rubber sheets having a thickness of 2 mm. The resultant specimen was vulcanized at a temperature of 150° C. under a press presure of 50 kg/cm² for 30 minutes. The vulcanized specimen was cut into a belt-shaped test piece having a width of 50 mm and a length of 500 mm.

The test piece was fixed to a roller having a diameter of 20 mm of the fatigue tester, under a load of 25 kg. The test piece was reciprocated 500,000 times at a temperature of 120° C. by rotating the roller at a rotation number of 120 rpm.

Then, the cord was taken out from the test piece, and the tensile strength TS of the tested cord was measured.

The tensile strength retention was calculated in accordance with the equation:

$$\text{Tensile strength retention (\%)} = \frac{TS}{TS_0} \times 100$$

EXAMPLES 1 TO 9 AND COMPARATIVE EXAMPLES 1 TO 3

In each of Examples 1 to 9, an aromatic polyamide multifilament yarn which had a yarn count of 1,500 deniers/1,000 filaments and was available under the trademark of Tecknola T-200, from Teijin Ltd., was employed.

A treating liquid was prepared by mixing a first liquid rubber component (A) consisting of a liquid 1,2-type polybutadiene glycol having a molecular weight of 3,000, and available under the trademark of Polybutadiene glycol G-3000, from Nihon Soda Kogyo K.K., with a solution of a second liquid rubber component (B) consisting of a liquid 1,2-type polybutadiene diisocyunate having a molecular weight of 3,000 in a concentration of 50% by weight in methylethylketone; which solution was available under the trademark of Polybutadiene Diisocyanate TP 1001, from Nihon Soda Kogyo K.K., in a mixing weight ratio (A)/(B) as shown in Table 1, by admixing, to the mixture, glycerol diglycidylether, available under the trademark of EX 313, from Nagase Kasei K.K., in an amount of 5% based on the total weight of the components (A) and (B), and dissolving the resultant admixture in a concentration of 20% by weight in toluene.

The aromatic polyamide multifilament yarn was immersed in the treating liquid and squeezed at a pick up of about 10% based on the weight of the multifilament yarn.

The resultant impregnated multifilament yarn was dried at a temperature of 150° C. for 2 minutes and heat-treated at a temperature of 250° C. for one minute to cure the rubber components (A) and (B).

The heat-treated multifilament yarn was doubled, and the doubled yarn was twisted at a twist coefficient K of 1.0.

Separately, an adhesive agent was prepared by mixing one part by weight of a resorcinol-formaldehyde resin having a molar ratio of resorcinol to formaldehyde of 1:6, and 5 parts by weight of a vinyl pyridine-styrene-butadiene terpolymer rubber latex (dry solid content: 5% by weight).

The adhesive agent was applied to the twisted double yarn so that the adhesive agent was attached in a dry solid amount of 5% based on the weight of the twisted yarn, dried at a temperature of 130° C. for 2 minutes and cured at a temperature of 240° C. for 2 minutes.

The resultant rubber reinforcing yarn was subjected to the above-mentioned tests.

In each of Comparative Examples 1 to 3, the same procedures as in Example 1 were carried out except that (i) in Comparative Example 1, the impregnating step with the treating liquid was omitted, (ii) in Comparative Example 2, the second liquid rubber component (B) was omitted from the treating liquid, and (iii) in Comparative Example 3, the first liquid rubber component (A) was omitted from the treating liquid.

The test results are shown in Table 1.

TABLE 1

| Example No. | Item | Weight ratio (A)/(B) | Fraying resistance | Bonding strength against peeling (kg/5 cords) | T-bonding strength (kg/cm) | Tensile strength retention upon fatiguing (%) |
|---|---|---|---|---|---|---|
| Example | 1 | 90/10 | 2 | 4.7 | 13.7 | 56 |
|  | 2 | 80/20 | 3 | 5.4 | 15.5 | 51 |
|  | 3 | 70/30 | 4 | 9.6 | 18.9 | 55 |
|  | 4 | 60/40 | 4 | 10.6 | 17.8 | 57 |
|  | 5 | 50/50 | 4 | 10.0 | 17.2 | 59 |
|  | 6 | 40/60 | 4 | 10.3 | 17.3 | 57 |
|  | 7 | 30/70 | 4 | 10.6 | 17.6 | 55 |
|  | 8 | 20/80 | 3 | 8.7 | 16.5 | 58 |
|  | 9 | 10/90 | 2 | 5.3 | 13.2 | 60 |
| Comparative Example | 1 | None | 1 | 2.2 | 9.6 | 55 |
|  | 2 | 100/0 | 1 | 3.5 | 10.6 | 59 |
|  | 3 | 0/100 | 1 | 4.5 | 12.9 | 58 |

Table 1 shows that the rubber reinforcing multifilament yarns of Examples 1 to 9 exhibited a satisfactory fraying resistance of individual filaments, a high bonding strength against peeling, a high T-bonding strength and a satisfactory tensile strength retention in the fatigue test.

EXAMPLES 10 TO 15 AND COMPARATIVE EXAMPLES 4 AND 5

In each of Examples 10 to 15 and Comparative Examples 4 and 5, a rubber-reinforcing aromatic polyamide multifilament yarn was produced by the same procedures as in Example 3, except that the heat-treating step was carried out at the temperature and for the time as shown in Table 2.

The test results are shown in Table 2.

TABLE 2

| Example No. | Item | Heat treating step Temperature (°C.) | Time (sec.) | Fraying resistance | Bonding strength against peeling (kg/5 cords) | T-bonding strength (kg/cm) | Tensile strength retention upon fatiguing (%) |
|---|---|---|---|---|---|---|---|
| Example | 3 | 150 | 120 | 4 | 9.6 | 18.9 | 55 |
|  | 10 | 100 | 100 | 2 | 6.0 | 15.8 | 70 |
|  | 11 | 150 | 150 | 3 | 7.4 | 17.4 | 67 |
|  | 12 | 150 | 180 | 3 | 8.0 | 19.3 | 65 |
|  | 13 | 150 | 200 | 3 | 8.2 | 19.5 | 60 |
|  | 14 | 150 | 220 | 4 | 9.0 | 19.0 | 58 |
|  | 15 | 150 | 260 | 4 | 9.9 | 18.4 | 50 |
| Comparative Example | 4 | 90 | 90 | 1 | 4.0 | 12.8 | 70 |
|  | 5 | 150 | 270 | 4 | 9.5 | 19.0 | 43 |

Table 2 shows that the heat-treating temperature must be in the range of from 100° C. to 260° C. and the heat-treating time must be from 100 to 260 seconds.

EXAMPLES 16 TO 24 AND COMPARATIVE EXAMPLES 6 TO 8

In each of Examples 16 to 24, an aromatic polyamide multifilament yarn having a yarn count of 1,500 deniers/1,000 filaments, and available under the trademark of Technola T-200, from Teijin Ltd., was used.

A treating liquid was prepared by mixing a first liquid rubber component (A) consisting of a liquid 1,4-type polybutadiene glycol having an epoxy gram equivalent of 200 and a molecular weight of 3,000, and available under the trademark of R-45 EPI, from Nagase Kasei Kogyo K.K., with a solution of 50% by weight of a second liquid rubber component (B) consisting of a liquid 1,2-type polybutadiene diisocyanate having a molecular weight of 3,000, in a solvent consisting of methylethylketone, which solution was available under the trademark of TP1001, from Nihon Soda Kogyo K.K., in a mixing weight ratio (A)/(B) as shown in Table 3, and dissolving the mixture in a concentration of 20% by weight in toluene.

The aromatic polyamide multifilament yarn was immersed in the treating liquid and squeezed at a pick up of about 10% based on the weight of the multifilament yarn.

The resultant impregnated multifilament yarn was dried at a temperature of 150° C. for 2 minutes and heat-treated at a temperature of 250° C. for one minute to cure the rubber components (A) and (B).

The heat treated multifilament yarn was doubled, and the doubled yarn was twisted at a twist coefficient K of 1.0.

Separately, an adhesive agent was prepared by mixing one part by weight of a resorcinol-formaldehyde resin having a molar ratio of resorcinol to formaldehyde of 1:6, with 5 parts by weight of a vinyl pyridine-styrene-butadiene terpolymer rubber latex (dry solid content: 5% by weight).

The adhesive agent was applied to the twisted yarn so that the adhesive agent was attached in a dry solid amount of 5% based on the weight of the twisted yarn, dried at a temperature of 130° C. for 2 minutes and cured at a temperature of 240° C. for 2 minutes.

The resultant rubber-reinforcing multifilament yarn was subjected to the above-mentioned tests.

In each of Comparative Examples 6 to 8, the same procedures as in Example 16 were carried out except that (i) in Comparative Example 6, the impregnating step with the treating liquid was omitted, (ii) in Comparative Example 7, the second liquid rubber component (B) was omitted from the treating liquid, and (iii) in Comparative Example 8, the first liquid rubber component (A) was omitted from the treating liquid.

The test results are shown in Table 3.

TABLE 3

| | | | Performance of resultant rubber-reinforcing yarn | | | |
|---|---|---|---|---|---|---|
| Example No. | Item | Weight ratio (A)/(B) | Fraying resistance | Bonding strength against peeling (kg/5 cords) | T-bonding strength (kg/cm) | Tensile strength retention upon fatiguing (%) |
| Example | 16 | 90/10 | 2 | 4.8 | 14.5 | 57 |
| | 17 | 80/20 | 3 | 5.8 | 17.1 | 58 |
| | 18 | 70/30 | 4 | 10.3 | 19.2 | 53 |
| | 19 | 60/40 | 4 | 11.6 | 18.9 | 56 |
| | 20 | 50/50 | 4 | 11.3 | 18.6 | 57 |
| | 21 | 40/60 | 4 | 11.2 | 18.7 | 56 |
| | 22 | 30/70 | 4 | 10.2 | 18.8 | 54 |
| | 23 | 20/80 | 3 | 8.9 | 17.5 | 55 |
| | 24 | 10/90 | 2 | 6.3 | 14.3 | 57 |
| Comparative Example | 6 | None | 1 | 2.2 | 9.6 | 55 |
| | 7 | 100/0 | 1 | 3.9 | 11.6 | 55 |
| | 8 | 0/100 | 1 | 4.1 | 11.9 | 52 |

Table 3 shows that the rubber reinforcing multifilament yarns of Examples 16 to 24 exhibited a sastifactory fraying resistance of individual filaments, a high bonding strength against peeling, a high T-bonding strength and a satisfactory tensile strength retention in the fatigue test.

EXAMPLES 25 TO 30 AND COMPARATIVE EXAMPLES 9 AND 10

In each of Examples 25 to 30 and Comparative Examples 9 and 10, a rubber-reinforcing aromatic polyamide multifilament yarn was produced by the same procedure as in Example 18, except that the heat-treating step was carried out at the temperature and for the time as shown in Table 4.

The test results are shown in Table 4.

TABLE 4

| Example No. | Item | Heat treating step | | Fraying resistance | Bonding strength against peeling (kg/5 cords) | T-bonding strength (kg/cm) | Tensile strength retention upon fatiguing (%) |
|---|---|---|---|---|---|---|---|
| | | Temperature (°C.) | Time (sec.) | | | | |
| Example | 18 | 150 | 120 | 4 | 10.3 | 19.2 | 53 |
| | 25 | 100 | 100 | 2 | 7.0 | 16.0 | 65 |
| | 26 | 150 | 150 | 3 | 8.4 | 18.4 | 64 |
| | 27 | 150 | 180 | 3 | 9.0 | 19.5 | 63 |
| | 28 | 150 | 200 | 3 | 9.5 | 19.8 | 61 |
| | 29 | 150 | 220 | 4 | 10.0 | 19.9 | 59 |
| | 30 | 150 | 260 | 4 | 9.8 | 18.4 | 48 |
| Comparative Example | 9 | 90 | 90 | 1 | 3.5 | 11.5 | 72 |
| | 10 | 150 | 270 | 4 | 9.0 | 17.5 | 40 |

Table 4 shows that the heat-treating temperature must be in the range of from 100° C. to 150° C. and the heat-treating time must be from 100 to 260 seconds.

EXAMPLES 31 TO 39 AND COMPARATIVE EXAMPLES 11 TO 13

In each of Examples 31 to 39, an aromatic polyamide multifilament yarn having a yarn count of 1,500 deniers/1,000 filaments, and available under the trademark of Technola T-200, from Teijin Ltd., was used.

A treating liquid was prepared by mixing a first liquid rubber component (A) consisting of a liquid 1,4-type polybutadiene diepoxide having a molecular weight of 3,000, and available under the trademark of R-45 EPT, from Nagase Kasei Kogyo K.K., with a solution of 50% by weight of a second liquid rubber component (B) consisting of a liquid 1,2-type polybutadiene diisocyanate having a molecular weight of 3,000, in a solvent consisting of methylethylketone; which solution was available under the trademark of TP1001, from Nihon Soda Kogyo K.K., in a mixing weight ratio (A)/(B) as shown in Table 5, and dissolving the mixture in a concentration of 20% by weight in toluene.

The aromatic polyamide multifilament yarn was immersed in the treating liquid and squeezed at a pick up of about 10% based on the weight of the multifilament yarn.

The resultant impregnated multifilament yarn was dried at a temperature of 150° C. for 2 minutes and heat-treated at a temperature of 250° C. for one minute to cure the rubber components (A) and (B).

The heat treated multifilament yarn was doubled, and the doubled yarn was twisted at a twist coefficient K of 1.0.

Separately, an adhesive agent was prepared by mixing one part by weight of a resorcinol-formaldehyde resin having a molar ratio of resorcinol to formaldehyde of 1:6, with 5 parts by weight of a vinyl pyridine-styrene-butadiene terpolymer rubber latex (dry solid content: 5% by weight).

The adhesive agent was applied to the twisted yarn so that the adhesive agent was attached in a dry solid amount of 5% based on the weight of the twisted yarn, dried at a temperature of 130° C. for 2 minutes and cured at a temperature of 240° C. for 2 minutes.

The resultant rubber-reinforcing multi-filament yarn was subjected to the above-mentioned tests.

In each of Comparative Examples 11 to 13, the same procedures as in Example 33 were carried out except that (i) in Comparative Example 11, the impregnating step with the treating liquid was omitted, (ii) in Comparative Example 12, the second liquid rubber component (B) was omitted from the treating liquid, and (iii) in Comparative Example 13, the first liquid rubber component (A) was omitted from the treating liquid.

The test results are shown in Table 5.

TABLE 5

| | | | Performance of resultant rubber-reinforcing yarn | | | |
|---|---|---|---|---|---|---|
| Example No. | Item | Weight ratio (A)/(B) | Fraying resistance | Bonding strength against peeling (kg/5 cords) | T-bonding strength (kg/cm) | Tensile strength retention upon fatiguing (%) |
| Example | 31 | 90/10 | 2 | 7.5 | 13.7 | 51 |
| | 32 | 80/20 | 3 | 8.8 | 15.5 | 53 |
| | 33 | 70/30 | 4 | 11.6 | 21.5 | 54 |
| | 34 | 60/40 | 4 | 11.2 | 20.3 | 57 |
| | 35 | 50/50 | 4 | 10.8 | 19.3 | 69 |
| | 36 | 40/60 | 4 | 10.7 | 18.7 | 67 |
| | 37 | 30/70 | 4 | 10.6 | 18.4 | 64 |
| | 38 | 20/80 | 3 | 8.6 | 16.5 | 55 |
| | 39 | 10/90 | 2 | 8.6 | 16.5 | 55 |
| Comparative Example | 11 | None | 1 | 2.2 | 9.6 | 55 |
| | 12 | 100/0 | 1 | 7.5 | 12.6 | 64 |
| | 13 | 0/100 | 1 | 4.5 | 12.9 | 58 |

Table 5 shows that the rubber reinforcing multifilament yarns of Examples 31 to 39 exhibited a satisfactory fraying resistance of individual filaments, a high bonding strength against peeling, a high T-bonding strength and a satisfactory tensile strength retention in the fatigue test.

EXAMPLES 40 TO 45 AND COMPARATIVE EXAMPLES 14 AND 15

In each of Examples 40 to 45 and Comparative Examples 14 and 15, a rubber-reinforcing aromatic polyamide multifilament yarn was produced by the same procedures as in Example 33, except that the heat-treating step was carried out at the temperature and for the time as shown in Table 6.

The test results are shown in Table 6.

TABLE 6

| | | Heat treating step | | | Bonding strength | | Tensile strength retention |
|---|---|---|---|---|---|---|---|
| Example No. | Item | Temperature (°C.) | Time (sec.) | Fraying resistance | against peeling (kg/5 cords) | T-bonding strength (kg/cm) | upon fatiguing (%) |
| Example | 33 | 150 | 120 | 4 | 11.6 | 21.5 | 54 |
| | 40 | 100 | 100 | 2 | 8.2 | 19.2 | 62 |
| | 41 | 150 | 150 | 3 | 9.1 | 19.6 | 61 |
| | 42 | 150 | 180 | 3 | 9.2 | 20.1 | 59 |
| | 43 | 150 | 200 | 4 | 9.6 | 20.4 | 55 |
| | 44 | 150 | 220 | 4 | 10.3 | 20.6 | 52 |
| | 45 | 150 | 260 | 4 | 10.6 | 20.2 | 49 |
| Comparative | 14 | 90 | 90 | 1 | 4.0 | 12.8 | 70 |

TABLE 6-continued

| Example No. | Item | Heat treating step Temperature (°C.) | Time (sec.) | Fraying resistance | Bonding strength against peeling (kg/5 cords) | T-bonding strength (kg/cm) | Tensile strength retention upon fatiguing (%) |
|---|---|---|---|---|---|---|---|
| Example | 15 | 150 | 270 | 4 | 9.5 | 19.0 | 43 |

Table 6 shows that the heat-treating temperature must be in the range of from 100° C. to 150° C. and the heat-treating time must be from 100 to 260 seconds.

EXAMPLES 46 TO 49 AND COMPARATIVE EXAMPLES 16 TO 18

In each of Examples 46 to 49, an aromatic polyamide multifilament yarn having a yarn count of 1,500 deniers/1,000 filaments, and available under the trademark of Technola T-200, from Teijin Ltd., was used.

A treating liquid was prepared in the following manner. A first liquid rubber component (A) consisting of a liquid 1,2-type polybutadiene glycol having a molecular weight of 3,000, and available under the trademark of G-3000, from Nihon Soda Kogyo K.K., was mixed with a solution of 50% by weight of a second liquid rubber component (B) consisting of a liquid 1,2-type polybutadiene diisocyanate having a molecular weight of 3,000, in a solvent consisting of methylethylketone, which solution was available under the trademark of TP1001, from Nihon Soda Kogyo K.K., in a mixing weight ratio (A)/(B) as shown in Table 7, and the mixture was dissolved in toluene.

The resultant solution was mixed with an antioxidant (D) consisting of 1,3,5-trimethyl-2,4,6-tris(3,5-di-tert-butyl-4-hydroxybenzylbenzene, which was available under the trademark of Irganox 1330, from Ciba Geigy, in an amount of 1% based on the total dry solid weight of the first and second liquid rubber components (A) and (B), and then with an additional epoxy component (C) consisting of glyceroldiglycidylether, which was available under the trademark of EX 313, from Nagase Kasei Kogyo K.K., in an amount of 5% based on the total dry solid weight of the first and second components (A) and (B), to provide the treating liquid having a concentration of 20% by dry solid weight.

The aromatic polyamide multifilament yarn was immersed in the treating liquid and squeezed at a pick up of about 10% based on the weight of the multifilament yarn.

The resultant impregnated multifilament yarn was dried at a temperature of 150° C. for 2 minutes and heat-treated at a temperature of 250° C. for one minute to cure the rubber components (A) and (B) and the glycerolglycidylether.

The heat treated multifilament yarn was doubled, and the doubled yarn was twisted at a twist coefficient K of 1.0.

Separately, an adhesive agent was prepared by mixing one part by weight of a resorcinol-formaldehyde resin having a molar ratio of resorcinol to formaldehyde of 1:6, with 5 parts by weight of a vinyl pyridine-styrene-butadiene terpolymer rubber latex (dry solid content: 5% by weight).

The adhesive agent was applied to the twisted yarn so that the adhesive agent was attached in a dry solid amount of 5% based on the weight of the twisted yarn, dried at a temperature of 130° C. for 2 minutes and cured at a temperature of 240° C. for 2 minutes.

The resultant rubber-reinforcing multifilament yarn was subjected to the above-mentioned tests.

In each of Comparative Examples 16 to 18, the same procedures as in Example 46 were carried out except that (i) in Comparative Example 16, the impregnating step with the treating liquid was omitted, (ii) in Comparative Example 17, the second liquid rubber component (B), the antioxidant (D) and the additional epoxy component (C) were omitted from the treating liquid, and (iii) in Comparative Example 18, the first liquid rubber component (A), the additional epoxy component (C) and the antioxidant were omitted from the treating liquid.

The test results are shown in Table 7.

TABLE 7

| Example No. | Item | Weight ratio (A)/(B) | Performance of resultant rubber-reinforcing yarn | | | |
|---|---|---|---|---|---|---|
| | | | Fraying resistance | Bonding strength against peeling (kg/5 cords) | T-bonding strength (kg/cm) | Tensile strength retention upon fatiguing (%) |
| Example | 46 | 90/10 | 2 | 5.1 | 13.9 | 59 |
| | 47 | 60/40 | 4 | 10.7 | 18.7 | 63 |
| | 48 | 40/60 | 4 | 10.4 | 18.6 | 65 |
| | 49 | 10/90 | 3 | 6.1 | 14.2 | 62 |
| Comparative Example | 16 | None | 1 | 10.3 | 17.3 | 59 |
| | 17 | 100/0 | 1 | 10.6 | 17.6 | 61 |
| | 18 | 0/100 | 2 | 5.3 | 13.2 | 62 |

Table 7 shows that the rubber reinforcing multifilament yarn of Examples 46 to 49 exhibited a satisfactory fraying resistance of individual filaments, a high bonding strength against peeling, a high T-bonding strength and a satisfactory tensile strength retention in the fatigue test.

EXAMPLES 50 TO 54

In each of Examples 50 to 54, a rubber-reinforcing aromatic polyamide multifilament yarn was produced by the same procedures as in Example 47 (weight ratio (A)/(B): 60/40), except that the antioxidant (D) was employed in the amount as indicated in Table 8.

The test results are shown in Table 8.

TABLE 8

| Example No. | Item | Amount of Antioxidant (D) (%) | Fraying resistance | Bonding strength against peeling (kg/5 cords) | T-bonding strength (kg/cm) | Tensile strength retention upon fatiguing (%) |
|---|---|---|---|---|---|---|
| Example | 47 | 1.0 | 4 | 10.7 | 18.7 | 63 |
|  | 50 | 0.5 | 4 | 10.3 | 18.5 | 57 |
|  | 51 | 1.5 | 4 | 10.1 | 18.0 | 60 |
|  | 52 | 2.0 | 4 | 9.3 | 17.8 | 65 |
|  | 53 | 3.0 | 4 | 8.5 | 17.5 | 55 |
|  | 54 | 0 | 4 | 10.3 | 17.3 | 59 |

EXAMPLES 55 TO 58 AND COMPARATIVE EXAMPLES 19 AND 20

In each of Examples 55 to 58 and Comparative Examples 19 and 20, a rubber-reinforcing aromatic polyamide multifilament yarn was produced by the same procedures as in Example 47, except that the heat-treating step was carried out at the temperature and for the time as shown in Table 9.

The test results are shown in Table 9.

TABLE 9

| Example No. | Item | Heat treating step Temperature (°C.) | Heat treating step Time (sec.) | Fraying resistance | Bonding strength against peeling (kg/5 cords) | T-bonding strength (kg/cm) | Tensile strength retention upon fatiguing (%) |
|---|---|---|---|---|---|---|---|
| Example | 47 | 150 | 120 | 4 | 10.7 | 18.9 | 63 |
|  | 55 | 100 | 100 | 2 | 6.2 | 15.3 | 70 |
|  | 56 | 150 | 150 | 3 | 7.4 | 16.5 | 67 |
|  | 57 | 150 | 200 | 3 | 8.5 | 17.9 | 65 |
|  | 58 | 150 | 180 | 4 | 8.0 | 19.3 | 65 |
| Comparative Example | 19 | 90 | 90 | 1 | 3.5 | 19.0 | 71 |
|  | 20 | 150 | 270 | 4 | 8.9 | 18.3 | 49 |

EXAMPLES 59 TO 62 AND COMPARATIVE EXAMPLES 21 TO 23

In each of Examples 59 to 62, an aromatic polyamide multifilament yarn having a yarn count of 1,500 deniers/1,000 filaments, and available under the trademark of Technola T-200, from Teijin Ltd., was used.

A treating liquid was prepared in the following manner. A first liquid rubber component (A) consisting of a liquid 1,2-type polybutadiene glycol having a molecular weight of 3,000, and available under the trademark of G-3000, from Nagase Kasei Kogyo K.K., was mixed with a solution of 50% by weight of a second liquid rubber component (B) consisting of a liquid 1,2-type polybutadiene diisocyanate having a molecular weight of 3,000, in a solvent consisting of methylethylketone; which solution was available under the trademark of TP1001, from Nihon Soda Kogyo K.K., in a mixing weight ratio (A)/(B) as shown in Table 10, and the mixture was dissolved in toluene.

The solution was mixed with an antiaging agent (E) consisting of 2,2,4-trimethyl-1,2-dihydoquinone polymer, which was available under the trademark of Antigen RD-G, from Sumitomo Kagaku Kogyo K.K., in an amount of 1% based on the total dry solid weight of the first and second liquid rubber components (A) and (B), and then with an additional epoxy component (C) consisting of glyceroldiglycidylether (EX313) in an amount of 5% based on the total dry solid weight of the liquid rubber components (A) and (B), to provide the treating liquid having a concentration of 20% by dry solid weight.

The aromatic polyamide multifilament yarn was immersed in the treating liquid and squeezed at a pick up of about 10% based on the weight of the multifilament yarn.

The resultant impregnated multifilament yarn was dried at a temperature of 150° C. for 2 minutes and heat-treated at a temperature of 250° C. for one minute to cure the rubber components (A) and (B) and the additional epoxy component (C).

The heat treated multifilament yarn was doubled, and the doubled yarn was twisted at a twist coefficient K of 1.0.

Separately, an adhesive agent was prepared by mixing one part by weight of a resorcinol-formaldehyde resin having a molar ratio of resorcinol to formaldehyde of 1:6, with 5 parts by weight of a vinyl pyridine-styrene-butadiene terpolymer rubber latex (dry solid content: 5% by weight).

The adhesive agent was applied to the twisted yarn so that the adhesive agent was attached in a dry solid amount of 5% based on the weight of the twisted yarn, dried at a temperature of 130° C. for 2 minutes and cured at a temperature of 240° C. for 2 minutes.

The resultant rubber-reinforcing multifilament yarn was subjected to the above-mentioned tests.

In each of Comparative Examples 21 to 23, the same procedures as in Example 59 were carried out except that (i) in Comparative Example 21, the impregnating step with the treating liquid was omitted, (ii) in Comparative Example 22, the second liquid rubber component (B), the antiaging agent (E), and the additional epoxy component (C) were omitted from the treating liquid, and (iii) in Comparative Example 8, the first liquid rubber component (A), the antiaging agent (E) and the additional epoxy component (C) were omitted from the treating liquid.

The test results are shown in Table 10.

TABLE 10

| Example No. | Item | Weight ratio (A)/(B) | Fraying resistance | Bonding strength against peeling (kg/5 cords) | T-bonding strength (kg/cm) | Tensile strength retention upon fatiguing (%) |
|---|---|---|---|---|---|---|
| Example | 59 | 90/10 | 2 | 4.9 | 12.5 | 61 |
|  | 60 | 60/40 | 4 | 10.5 | 17.7 | 65 |
|  | 61 | 40/60 | 4 | 10.1 | 17.2 | 63 |
|  | 62 | 10/90 | 3 | 5.8 | 13.7 | 61 |
| Comparative | 21 | None | 1 | 10.3 | 17.3 | 59 |
| Example | 22 | 100/0 | 1 | 10.6 | 17.6 | 61 |
|  | 23 | 0/100 | 2 | 5.3 | 13.2 | 62 |

Table 10 shows that the rubber reinforcing multifilament yarns of Examples 59 to 62 exhibited a satisfactory fraying resistance of individual filaments, a high bonding strength against peeling, a high T-bonding strength and a satisfactory tensile strength retention in the fatigue test.

EXAMPLES 63 TO 67

In each of Examples 63 to 67, a rubber-reinforcing aromatic polyamide multifilament yarn was produced by the same procedures as in Example 60 (weight ratio (A)/(B): 60/40), except that the antiaging agent was employed in the amount as shown in Table 11.

The test results are shown in Table 11.

TABLE 11

| Example No. | Item | Amount of Antiaging agent (%) | Fraying resistance | Bonding strength against peeling (kg/5 cords) | T-bonding strength (kg/cm) | Tensile strength retention upon fatiguing (%) |
|---|---|---|---|---|---|---|
| Example | 60 | 1.0 | 4 | 10.5 | 17.7 | 65 |
|  | 63 | 0.5 | 4 | 10.3 | 18.5 | 61 |
|  | 64 | 1.5 | 4 | 9.8 | 17.0 | 62 |
|  | 65 | 2.0 | 4 | 8.9 | 17.3 | 63 |
|  | 66 | 3.0 | 4 | 7.3 | 17.1 | 57 |
|  | 67 | 0 | 4 | 10.3 | 17.3 | 59 |

EXAMPLES 78 TO 71 AND COMPARATIVE EXAMPLES 24 AND 25

In each of Examples 68 to 71 and Comparative Examples 24 and 25, a rubber-reinforcing aromatic polyamide multifilament yarn was produced by the same procedures as in Example 60, except that the heat-treating step was carried out at the temperature and for the time as shown in Table 12.

The test results are shown in Table 12.

EXAMPLES 72 to 77

In each of Examples 72 to 76, an aromatic polyamide multifilament yarn having a yarn count of 1,500 deniers/1,000 filaments, and available under the trademark of Technola T-200, from Teijin Ltd., was used.

A treating liquid was prepared in the following manner. A first liquid rubber component (A) consisting of a liquid 1,2-type polybutadiene glycol a molecular weight of 3,000, and available under the trademark of G-3000, from Nihon Soda Kogyo K.K., was mixed with a solution of 50% by weight of a second liquid rubber component (B) consisting of a liquid 1,2-type polybutadiene diisocyanate having a molecular weight of 3,000, in a solvent consisting of methylethylketone; which solution was available under the trademark of TP1001, from Nihon Soda Kogyo K.K., in a mixing weight ratio (A)/(B) as shown in Table 13, and the mixture was dissolved in toluene.

The mixture was added with a rubber antiaging agent (E) consisting of 2,2,4-trimethyl1,2-dihydroquinone polymer (Antigen RD-G) in an amount of 1% based on the total dry solid weight of the liquid rubber components (A) and (B), and then with an additional epoxy component (C) consisting of glyceroldiglycidylether (EX-313) in an amount of 5% based on the total dry

TABLE 12

| Example No. | Item | Heat treating step Temperature (°C.) | Time (sec.) | Fraying resistance | Bonding strength against peeling (kg/5 cords) | T-bonding strength (kg/cm) | Tensile strength retention upon fatiguing (%) |
|---|---|---|---|---|---|---|---|
| Example | 60 | 150 | 150 | 4 | 10.5 | 17.7 | 65 |
|  | 68 | 100 | 100 | 2 | 5.7 | 14.8 | 71 |
|  | 69 | 150 | 150 | 3 | 6.8 | 15.7 | 66 |
|  | 70 | 150 | 200 | 3 | 8.3 | 17.5 | 67 |
|  | 71 | 150 | 180 | 4 | 8.1 | 19.1 | 66 |
| Comparative | 24 | 90 | 90 | 1 | 3.3 | 13.5 | 71 |
| Example | 25 | 150 | 270 | 4 | 8.4 | 17.4 | 49 | solid weight of the components (A) and (B), to provide the treating liquid having a concentration of 20% by dry solid weight.

The aromatic polyamide multifilament yarn was immersed in the treating liquid and squeezed at a pick up of about 10% based on the weight of the multifilament yarn.

The resultant impregnated multifilament yarn was dried at a temperature of 150° C. for 2 minutes and heat-treated at a temperature of 250° C. for one minute to cure the rubber components (A) and (B).

The heat treated multifilament yarn was primarily twisted in Z direction at the twist coefficient K as indicated in Table 13. The primarily twisted multifilament yarn was doubled and finally twisted in S direction at a twist coefficient K of 2.0.

Separately, an adhesive agent was prepared by mixing one part by weight of a resorcinol-formaldehyde resin having a molar ratio of resorcinol to formaldehyde of 1:6, with 5 parts by weight of a vinyl pyridine-styrene-butadiene terpolymer rubber latex (dry solid content: 5% by weight).

The adhesive agent was applied to the twisted yarn so that the adhesive agent was attached in a dry solid amount of 5% based on the weight of the twisted yarn, dried at a temperature of 130° C. for 2 minutes and cured at a temperature of 240° C. for 2 minutes.

In Example 77, the same procedures as in Example 72 were carried out except that in the twisting step, the primary twisting operation was omitted.

The resultant rubber-reinforcing multifilament yarns were subjected to the above-mentioned test.

The test results are shown in Table 13.

EXAMPLES 78 TO 83

In each of Examples 78 to 83, a rubber-reinforcing aromatic polyamide multifilament yarn was produced by the same procedures as in Example 72, except that in the treating liquid for the impregnating step, the first liquid rubber component (A) consisted of a liquid 1,4-type polybutadiene diepoxide (trademark: R-45 EPT, Nagase Kasei Kogyo K.K.) having a molecular weight of 3,000, and in Examples 78 to 82, the primary twisting operation was carried out at the twist coefficient as indicated in Table 14, and in Example 83, the primary twisting operation was omitted.

The test results are shown in Table 14.

TABLE 14

| Example No. | Item | Twist coefficient in primary twisting operation | Performance of resultant rubber-reinforcing yarn ||||
|---|---|---|---|---|---|---|
| | | | Fraying resistance | Bonding strength against peeling (kg/5 cords) | T-bonding strength (kg/cm) | Tensile strength retention upon fatiguing (%) |
| Example | 78 | 0.1 | 4 | 10.7 | 18.0 | 59 |
| | 79 | 0.2 | 4(*)1 | 11.8 | 18.6 | 65 |
| | 80 | 0.5 | 4(*)1 | 11.5 | 19.5 | 70 |
| | 81 | 1.0 | 4(*)1 | 11.6 | 18.5 | 68 |
| | 82 | 1.1 | 4 | 10.8 | 18.2 | 59 |
| | 83 | — | 3 | 10.6 | 17.9 | 58 |

Table 14 shows that the primary twisting operation in the twisting step at a twist coefficient of 0.2 to 1.0 (Examples 79 to 81) effectively enhanced the performances of the rubber-reinforcing multifilament yarn.

What we claim is:

1. A process for producing a rubber-reinforcing aromatic polyamide multifilament yarn, comprising the steps of:

impregnating an aromatic polyamide multifilament yarn with a treating liquid comprising, (A) a first liquid rubber component comprising at least one rubber compound provided with two terminal groups consisting of a member selected from the group consisting of hydroxyl and epoxy groups per molecule thereof and having a molecular weight of from 500 to 10,000, and (B) a second liquid rubber component comprising at least one rubber compound provided with two terminal isocyanate groups per molecule thereof and having a molecular weight of 500 to 10,000;

heat-treating the impregnated multifilament yarn at a temperature of from 100° C. to 260° C. for 30 to 260 seconds;

twisting the heat-treated multifilament yarn at a twist coefficient satisfying the relationship (I):

TABLE 13

| Example No. | Item | Twist coefficient K in primary twisting operation | Fraying resistance | Bonding strength against peeling (kg/5 cords) | T-bonding strength (kg/cm) | Tensile strength retention upon fatiguing (%) |
|---|---|---|---|---|---|---|
| Example | 72 | 0.1 | 4 | 10.6 | 17.9 | 58 |
| | 73 | 0.2 | 4(*)1 | 11.6 | 18.5 | 63 |
| | 74 | 0.5 | 4(*)1 | 11.3 | 19.3 | 68 |
| | 75 | 1.0 | 4(*)1 | 11.4 | 18.2 | 65 |
| | 76 | 1.1 | 4 | 10.7 | 17.9 | 58 |
| | 77 | — | 3 | 10.5 | 17.8 | 57 |

Note:
(*)1... Extremely excellent in fraying resistance

Table 13 shows that in the twisting step the primary twisting operation at a twist coefficient K of 0.2 to 1.0 (Examples 73 to 75) effectively enhanced the fraying resistance, the bonding strength against peeling, the T-bonding strength and the retention in tensile strength of the rubber-reinforcing multifilament yarn.

$$1 \leq K \leq 5 \quad (I)$$

wherein K represents a twist coefficient of the multifilament yarn, defined by the equation (II):

$$K = (T \times D^{\frac{1}{2}})/2874 \quad (II)$$

in which T represents a twist number per m of the multifilament yarn, applied thereto, and D represents a total denier of the multifilament yarn; and applying an adhesive agent comprising a resorcinol-formaldehyde resin and a rubber latex, to the twisted multifilament yarn.

2. The process as claimed in claim 1, wherein the aromatic polyamide multifilament yarn comprises an aromatic polyamide having aromatic recurring units in an amount of 80 to 100 molar % based on the total molar amount of all the recurring units.

3. The process as claimed in claim 2, wherein the aromatic recurring units are selected from the group consisting of 1,4-phenylene group, 1,3-phenylene group, 4,4'-biphenylene group, 1,5-naphthylene group, 2,6-naphthylene group and 2,5-pyridilene group.

4. The process as claimed in claim 1, wherein the rubber compound of the first liquid rubber component (A) is selected from the group consisting of 1,2-polybutadiene glycol, 1,4-polybutadiene glycol, 1,2 and 1,4-polybutadiene polyisoprene glycol, polychloroprene glycol, poly-1,3-pentadiene glycol and polycyclopentadiene glycol.

5. The process as claimed in claim 1, wherein the rubber terminal-epoxidized compound of the first liquid rubber compound (A) is selected from the group consisting of 1,2-polybutadiene, 1,4-polybutadiene, 1,2 and 1,4-polybutadiene, polyisoprene, polychloroprene, poly-1,3-pentadiene and polycyclopentadiene compounds.

6. The process as claimed in claim 1, wherein the rubber compound of the second liquid rubber compound (B) is selected from the group consisting of 1,2-polybutadiene diisocyanate, 1,4-polybutadiene diisocyanate, 1,2 and 1,4-polybutadiene diisocyanate, polyisoprene diisocyanate, polychloroprene diisocyanate, poly-1,3-pentadiene diisocyanate, and polycyclopentadiene diisocyanate.

7. The process as claimed in claim 1, wherein the first liquid rubber component (A) and the second liquid rubber component (B) are present in a weight ratio of 1:9 to 9:1.

8. The process as claimed in claim 1, wherein in the impregnating step, the treating liquid is impregnated in an amount of 1 to 25% by dry solid weight based on the weight of the multifilament yarn, therein.

9. The process as claimed in claim 1, wherein the treating liquid further comprises an organic solvent consisting of at least one member selected from the group consisting of toluene, tetrahydrofuran, dioxane, methylethylketone and ethyl acetate; and the first and second liquid rubber components (A) and (B) are dissolved in the organic solvent.

10. The process as claimed in claim 1, wherein the resorcinol-formaldehyde resin for the adhesive agent is a condensation reaction product of resorcinol and formaldehyde in a molar ratio of from 1:0.1 to 1:8.

11. The process as claimed in claim 1, wherein the rubber latex for the adhesive agent comprises at least one member selected from the group consisting of natural rubber latex, styrene-butadiene copolymer rubber latex, vinyl pyridine-styrene-butadiene terpolymer rubber latex, acrylonitrile copolymer rubber latex, hydrogenated acrylonitrile copolymer latex, chlorosulfonated polyethylene rubber latex and polychloroprene rubber latex.

12. The process as claimed in claim 1, wherein the adhesive agent further comprises an additional reactant consisting of at least one member selected from the ethyleneurea compounds of the formula:

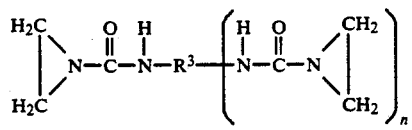

wherein $R^3$ represents a member selected from the group consisting of monovalent or divalent aromatic and aliphatic hydrocarbon groups, and n represents zero or an integer of 1 or 2, and blocked isocyanate compounds.

13. The process as claimed in claim 12, wherein the additional reactant is present in an amount of 0.5 to 30% by weight based on the total dry solid weight of the resorcinol-formaldehyde resin and the rubber latex.

14. The process as claimed in claim 1, wherein the adhesive agent is applied in an amount of 1 to 10% by dry solid weight based on the weight of the twisted filament yarn.

15. The process as claimed in claim 1, wherein the adhesive agent applied to the twisted multifilament yarn is dried at a temperature of from 100° C. to 150° C. and cured at a temperature of from 150° C. to 260° C.

16. The process as claimed in claim 1, wherein the treating liquid for the impregnating step further comprises an additional epoxy component comprising at least one epoxy compound containing at least two epoxy groups per molecule thereof and having an epoxy gram equivalent of 0.2 per 100 g of the epoxy compound.

17. The process as claimed in claim 16, wherein the epoxy compound is selected from the group consisting of reaction products of polyhydric aliphatic alcohol compounds with halogen-containing epoxide compounds, reaction products of polyhydric phenol compounds with halogen-containing epoxide compounds, and polyepoxidization reaction products of unsaturated organic compounds.

18. The process as claimed in claim 16, wherein the additional epoxy component is present in an amount of 0.01 to 1.0 part by dry solid weight per part of the total dry solid weight of the first and second liquid rubber components (A) and (B).

19. The process as claimed in claim 1, wherein the hydroxyl-terminated rubber compound of the first liquid rubber component (A) is further provided with at least one epoxy group located in the inside portion of the molecule thereof.

20. The process as claimed in claim 19, wherein the hydroxy-terminated, epoxy-containing rubber compound is selected from the group consisting of poly-1,2-butadiene glycol, poly-1,4-butadiene glycol, polyisoprene glycol, polycloroprene glycol, poly-1,3-pentadiene glycol, and polycyclopentadiene glycol compounds.

21. The process as claimed in claim 1, wherein the treating liquid for the impregnating step further comprises an antioxidant comprising at least one member selected from the group consisting of antioxidant hindered phenolic compounds, antioxidant amine compounds, antioxidant phosphorus compounds and antioxidant sulfur compounds.

22. The process as claimed in claim 21, wherein the antioxidant comprises at least one member selected from the group consisting of triethyleneglycol-bis[3-(3-t-butyl-6-methyl-4-hydroxyphenyl)propionate], 1,6-hexanediol-bis[3-(3,5-di-tert-butyl-4hydroxyphenyl)-propionate], 2,4-bis(n-octylthio)-6-(4-hydroxy-3,5-di-tert-butylanilino)-1,3,5-triazine, pentaerythrityl-tetrakis[3-(3,5-di-tert-butyl-4hydroxyphenyl)propionate], 2,2-thio-diethylene-bis[3-(3,5-di-tert-butyl-4-hydroxyphenyl)propionate], octadecyl-3-(3,5-di-tert-butyl-4-hydroxyphenyl)propionate, N,N'-hexamethylene-bis(3,5-di-tert-butyl-4-hydroxycinnamamide, 1,3,5-trimethyl-2,4,6tris(3,5-di-tert-butyl-4-hydroxybenzyl)-benzene, 2,2thiobis(4-methyl-6-tert-butylphenol), 3,5-di-tert-butyl-4-hydroxybenzylphosphonate di-ethylester, N,N'-di-sec-butyl-p-phenylenediamine, alkylated diphenylamines trisnonylphenylphosphite, triphenylphosphite, tris(2,4-di-tert-butyl-phenyl)phosphite, dibutyl-3,3'-thiodipropionate, dimystyl-3,3'-thiodipropionate, distearyl-3,3'-thiodipropionate, pentaerythrityltetrakis(3-laurylthiopropionate) and ditridecyl-3,3thiodipropionate.

23. The process as claimed in claim 19, wherein the antioxidant is present in an amount of 0.005 to 0.05 parts by weight per part by the total weight of the first and second liquid rubber components (A) and (B).

24. The process as claimed in claim 1, wherein the treating liquid for the impregnating step further comprises a rubber antiaging agent comprising at least one member selected from the group consisting of antiaging aldehyde-amine reaction products, antiaging ketone-amine reaction products, antiaging amine compounds and antiaging phenol compounds.

25. The process as claimed in claim 24, wherein the rubber antiaging agent comprises at least one member selected from the group consisting of condensation reaction products of acetaldol with 1-naphthylamine, polymerization products of 2,2,4-trimethyl-1,2-dihydroquinoline, N,N'-dinaphthyl-p-phenylene diamine, styrene-modified phenol compounds, 2,6-di-tert-dibutylmethylphenol, 2,2'-methylene-bis(4-methyl-6-tert-butylphenol), and 4,4'-thiobis(3-methyl-6-tert-butylphenol).

26. The process as claimed in claim 24, wherein the rubber antiaging agent is present in an amount of 0.005 to 0.05 parts by weight per part of the total dry solid weight of the first and second liquid rubber compounds (A) and (B).

27. The process as claimed in claim 1, wherein in the twisting step, the heat-treated multifilament yarn is primarily twisted at a primary twist coefficient of from 0.2 to 1.0, and then a plurality of the primarily twisted multifilament yarns are paralleled to each other, and the resultant paralleled multifilament yarn is finally twisted at a final twist coefficient satisfying the relationship (I):

$$1 \leq K \leq 5 \tag{I}$$

wherein K is as defined above.

28. The process as claimed in claim 1, wherein the treating liquid for the impregnating step further comprises nickel dibutylthiocarbamate.

* * * * *